(12) United States Patent
Froemel

(10) Patent No.: US 9,942,655 B2
(45) Date of Patent: Apr. 10, 2018

(54) SOUND PROCESSING

(71) Applicant: Infineon Technologies AG, Neubiberg (DE)

(72) Inventor: Andreas Froemel, Ulm (DE)

(73) Assignee: Infineon Technologies AG, Neubiberg (DE)

( * ) Notice: Subject to any disclaimer, the term of this patent is extended or adjusted under 35 U.S.C. 154(b) by 683 days.

(21) Appl. No.: 14/033,208

(22) Filed: Sep. 20, 2013

(65) Prior Publication Data

US 2015/0086064 A1    Mar. 26, 2015

(51) Int. Cl.
| | |
|---|---|
| *H04R 3/00* | (2006.01) |
| *H04R 5/033* | (2006.01) |
| *H04R 27/00* | (2006.01) |
| *H04R 13/02* | (2006.01) |
| *G06F 13/40* | (2006.01) |
| *H04R 1/04* | (2006.01) |

(52) U.S. Cl.
CPC ........... *H04R 3/00* (2013.01); *G06F 13/4081* (2013.01); *H04R 1/04* (2013.01); *H04R 2499/11* (2013.01)

(58) Field of Classification Search
CPC    H04R 25/658; H04R 1/1025; H04R 2420/03; G06F 13/4081; H01R 13/02; H01R 24/58
USPC .................... 381/77, 122, 394, 74
See application file for complete search history.

(56) References Cited

U.S. PATENT DOCUMENTS

| | | | |
|---|---|---|---|
| 6,411,711 B1 | 6/2002 | Gancarcik | |
| 8,932,069 B2 | 1/2015 | Kim et al. | |
| 2004/0175993 A1 | 9/2004 | Chennakeshu | |
| 2007/0246291 A1* | 10/2007 | Drake | H04R 5/02 181/141 |
| 2009/0158849 A1* | 6/2009 | Gregg | H04R 29/00 73/584 |
| 2009/0180628 A1* | 7/2009 | Stephanson | G08B 13/1672 381/58 |
| 2010/0216526 A1 | 8/2010 | Chen et al. | |
| 2012/0270610 A1 | 10/2012 | Chang et al. | |
| 2012/0329524 A1* | 12/2012 | Kent | G06F 3/044 455/566 |
| 2013/0094680 A1* | 4/2013 | Allen | H04R 1/1041 381/190 |
| 2013/0188807 A1* | 7/2013 | Slotte | H04R 3/00 381/99 |

FOREIGN PATENT DOCUMENTS

| | | |
|---|---|---|
| CN | 1781221 A | 5/2006 |
| KR | 20130063313 A | 6/2013 |
| WO | 2013074270 A1 | 5/2013 |

* cited by examiner

*Primary Examiner* — George Monikang
(74) *Attorney, Agent, or Firm* — Slater Matsil, LLP

(57) ABSTRACT

Embodiments of the present invention provide a socket that comprises a socket body. The socket body forms a socket cavity for receiving a plug. The socket further comprises an acoustic device and a sound port. The sound port is disposed in the socket body for acoustically coupling the acoustic device with the cavity.

23 Claims, 7 Drawing Sheets

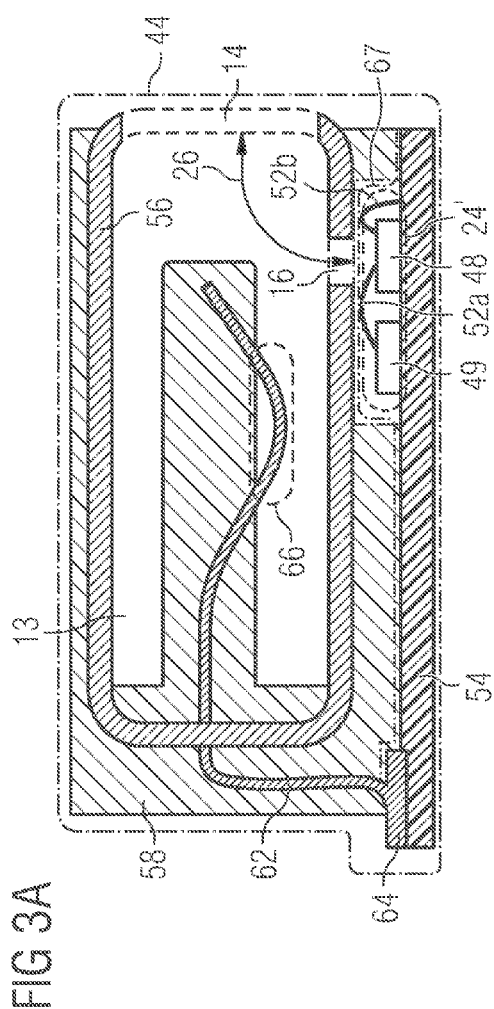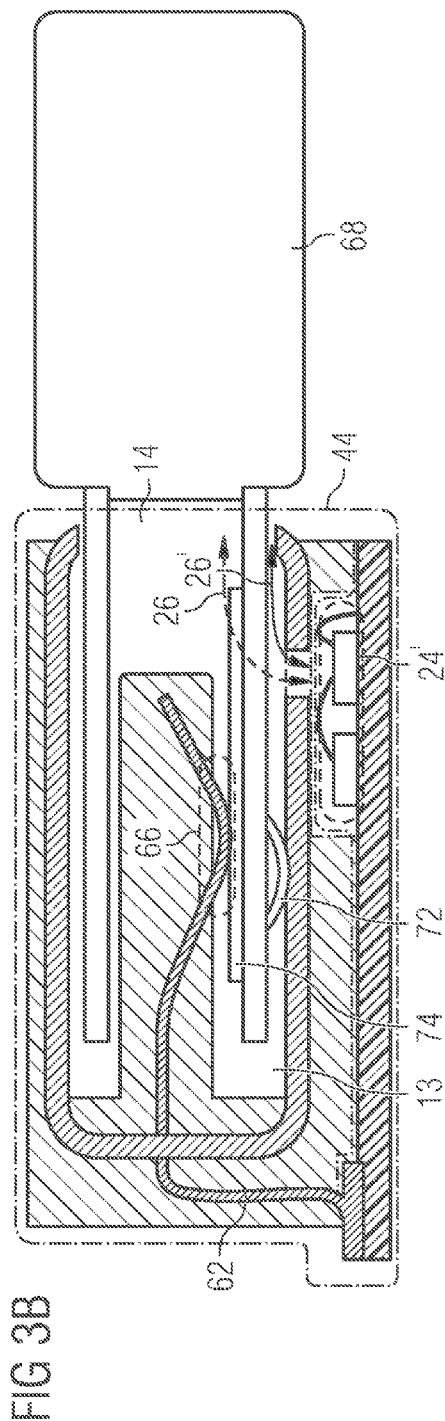

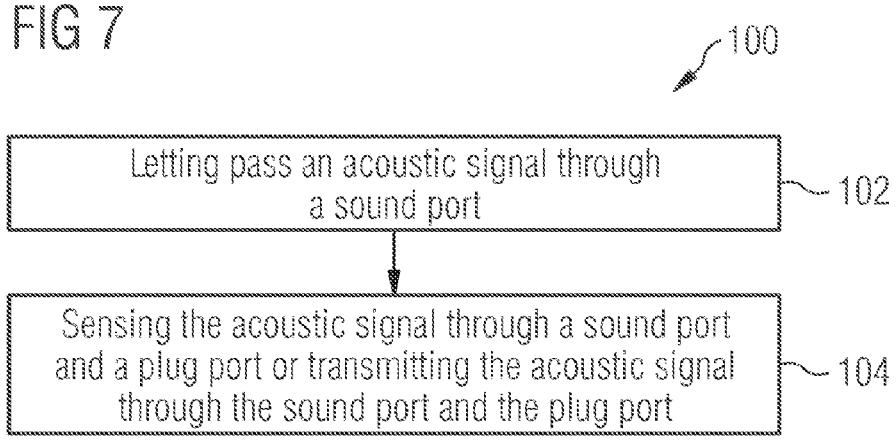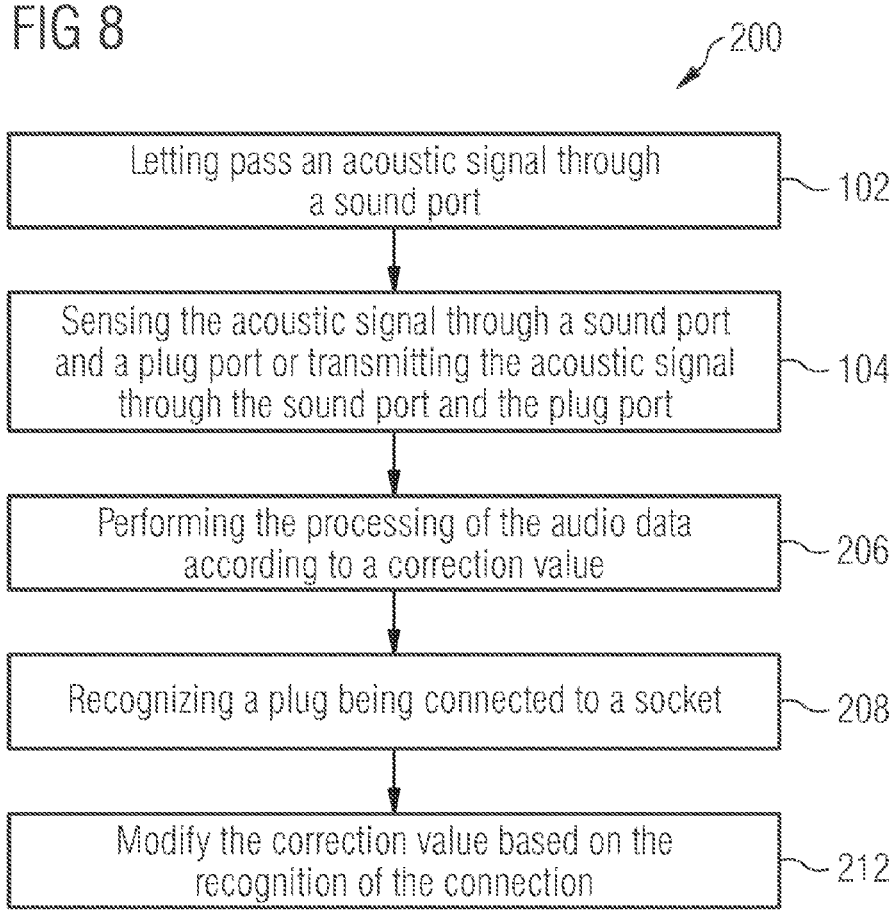

SOUND PROCESSING

TECHNICAL FIELD

The invention relates to sound processing so that acoustic signals pass a sound port.

BACKGROUND

An apparatus for sound processing may comprise an interface to sense acoustic signals from outside the apparatus or to transmit acoustic signals to outside the apparatus. A sensed or transmitted acoustic signal may pass a sound port while travelling from or to the interface.

SUMMARY OF THE INVENTION

Embodiments provide a socket that comprises a socket body. The socket body forms a socket cavity for receiving a plug. The socket further comprises an acoustic device and a sound port disposed in the socket body for acoustically coupling the acoustic device with the cavity.

Further Embodiments provide a sound processing apparatus which comprises a socket (female connector) that comprises a socket body. The socket body forms a socket cavity for receiving a plug. The socket further comprises an acoustic device and a sound port disposed in the socket body for acoustically coupling the acoustic device with the cavity.

Further embodiments provide a sound processing cellular phone configured to process audio data based on a correction value. The cellular phone comprises an electrical socket with a socket body forming a socket cavity for receiving the plug. The cellular phone further comprises a housing comprising an opening forming at least partially a plug port to let pass the plug. The electrical socket comprises a sound port formed in the socket body. The cellular phone further comprises a microphone configured to sense an acoustic signal through the sound port and the plug port. A path between the plug port and the microphone comprises the sound port and defines a sound channel. The cellular phone is configured to recognize a connection of the plug to the electrical socket, wherein the cellular phone is further configured to modify the correction value dependent on the recognition.

Further embodiments provide a method for processing audio data. The method comprises letting an acoustic signal pass through a sound port and sensing the acoustic signal through the sound port and a plug port or transmitting the acoustic signal through the sound port and the plug port.

BRIEF DESCRIPTION OF THE DRAWINGS

Embodiments of the present invention are described herein making reference to the appended drawings.

FIG. 3a shows a schematic cross-sectional view of an USB socket having a microphone according to an embodiment of the present invention;

FIG. 3b shows a schematic cross-sectional view of the USB socket with the microphone shown in FIG. 3a, wherein an USB plug is connected to the USB socket;

FIG. 7 shows a flowchart of a method for processing audio data according to an embodiment of the present invention; and FIG. 8 shows a flowchart of a further method for processing audio data according to an embodiment of the present invention.

DETAILED DESCRIPTION OF ILLUSTRATIVE EMBODIMENTS

Figure 1:
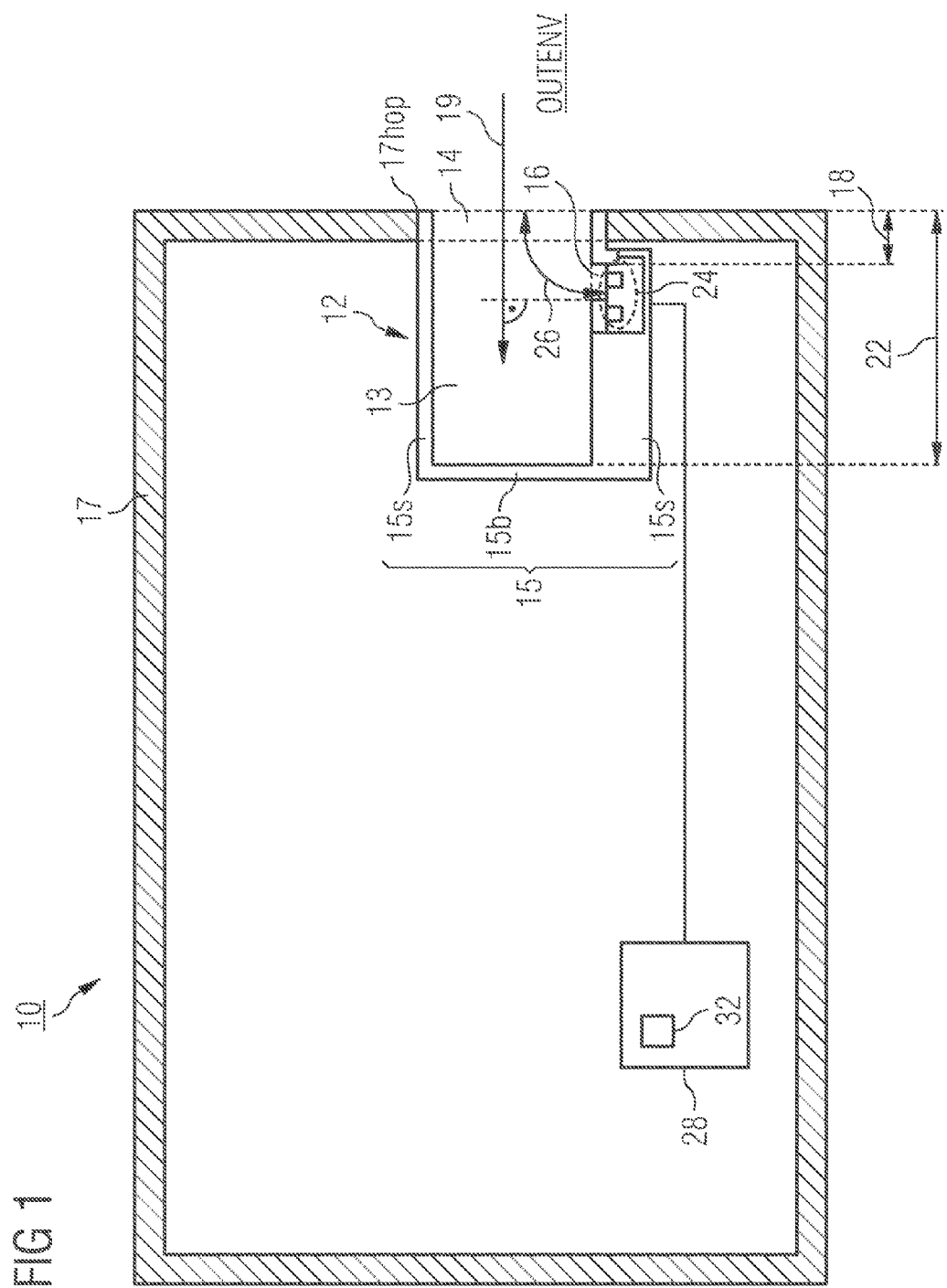
FIG. 1 shows a schematic block diagram of a sound processing apparatus according to an embodiment of the present invention.

Equal or equivalent elements or elements with equal or equivalent functionality are denoted in the following description by equal or equivalent reference numerals so that a description provided with respect to one figure shall be understood to be also valid for elements with equal or equivalent reference numeral in another figure.

In the following description, a plurality of details are set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a schematic block diagram of a sound processing apparatus 10. The apparatus 10 may be any mobile or immobile apparatus, e.g., a desktop computer, a laptop or a tablet computer, a cellular phone or a camera configured to record pictures and/or movies, the movies including audio data. The apparatus may also be a sensor, e.g., an ultrasonic sensor configured to sense acoustic signals in terms of ultrasound signals. Apparatus 10 comprises a socket 12, wherein the socket 12 may be an arbitrary electrical socket, such as an universal serial bus (USB) socket, an audio/video (AV) socket, a charging socket, a power supply socket or a system connector. The socket 12 may be, for example, a female connector of an interface of the apparatus 10 forming a socket and/or a cavity 13. The socket 12 may include a socket body 15. The socket body 15 may include one or more side walls 15s and a bottom wall 15b. The socket body 15 may be formed of any material. The socket 12 may further include a socket cavity 13. The socket cavity 13 may be formed (e.g., defined) by the socket body 15 (e.g., by the positioning of the side walls 15s and the bottom wall 15b of the socket body 15). The socket cavity 13 may be configured to receive a plug, e.g., a USB plug. The socket 12 is configured to be connectable with the associated plug, such as, for example, a USB plug in case socket 12 is formed as a USB socket. A connection of the associated plug to the socket 12 is performed by plugging the associated plug into the socket 12 through a plug port 14 which may be formed as an opening of the socket body 15 of the socket 12. The plug port 14 may have any shape such as, for example, oval, rectangular, circular, square, etc. In one or more embodiments, the plug port 14 may be a slit. The plug port 14 may be configured to take up the associated plug. In other words, the socket 12 may be configured to receive a plug and to enable an electrical connection between the socket and the plug. The plug port 14 may be configured to let an acoustic signal pass from outside the apparatus 10 to inside the cavity 13 of the socket 12 or from inside the socket cavity 13 of the socket 12 to outside the apparatus 10.

The apparatus 10 may further comprise a housing 17. The housing may include a housing opening 17hop. At least a portion of the housing opening 17hop may form the plug port 14 which may enable a plug to be connected to the socket 12. If, for example, the socket body 15 of the socket 12 is arranged along an outer face of apparatus 10, then the socket body 15 of the socket 12 may reach through the housing 17. In such a case it may be that the housing opening 17hop may be larger than the plug port 14 so that only a portion of the housing opening 17hop of the housing 17 includes the plug port. Alternatively, in one or more embodiments, the socket body 15 of the socket 12 may be, for example, covered by the housing 17 so that the housing opening 17hop and the plug port 14 have a same size. The socket body 15 of the socket 12 may be arranged in a way, that the housing 17 covers the socket body 15 of the socket 12 and a surface of the socket 12.

In one or more embodiments, it may be possible that the housing 17 forms a portion of the socket body 15. For example, in one or more embodiments, the housing 17 may form all or a portion of a sidewall (e.g., a sidewall 15s) of the socket body 15.

The socket 12 may comprise a sound port 16 configured to let an acoustic signal pass. The sound port 16 may be formed as an opening (for example, a hole) in the socket body 15 of the socket 12. The sound port 16 (for example, an opening) may be acoustically coupled to the socket cavity 13 of the socket 12. In one or more embodiments, the sound port 16 may comprise a grille which may be configured to prevent particles, e.g., dirt, from passing the sound port 16. The grille may, for example, be in the form of a mesh, a screen, a perforated plate, etc. The grille may, for example, take any form that permits passage of sound but prevents passage of particles (e.g., dirt). The grille may comprise a metallic material or a non-metallic material (for example, a plastic). The sound port 16 may comprise any geometry, e.g., a round, oval, elliptic or polygon shape.

The sound port 16 may be disposed at any location within the socket body 15. In one or more embodiments, a lateral distance 18 between the plug port 14 and the sound port 16 may be about 50% or less of the depth 22 of the socket 12. The depth 22 of the socket 12 may be measured along a plugging direction 19 of the plug. The plugging direction 19 may be the direction a plug is plugged into the cavity 13 or out of the cavity 13. In one or more embodiments, the lateral distance 18 may be about 25% or less of the plugin length 22. In one or more embodiments, the lateral distance 18 may be about 15% or less of the depth 22. In one or more embodiments, the sound port 16 may be closer to the plug port 14 than from the bottom wall 15b of the socket body 15.

In one or more embodiments, the sound port 16 may be formed in one of the sidewalls 15s of the socket body 15. In one or more embodiments, the sound port 16 may be formed in the socket body 15 opposite the plug port 14, e.g., in the bottom wall 15b, such that the lateral distance 18 is about the depth 22. In one or more embodiments, the sound port 16 may extend along a direction transversal to a plugging direction 19 of the socket 12, e.g., when the socket body is formed round or elliptical. In one or more embodiments, the sound port 16 may be aligned along a direction substantially parallel to the plugging direction 19 of the socket 12, e.g., when the socket body is curved such that a bottom of the socket body is formed by one or more curved side walls 15s and the sound port 16 is disposed opposite of the plug port 14.

The sound processing apparatus 10 may comprise an acoustic device 24. In one or more embodiments, the acoustic device may be or may comprise an acoustic transducer. In one or more embodiments, the acoustic device 24 may be arranged so as to be in acoustic communication with the sound port 16. In one or more embodiments, the acoustic device 24 may be acoustically coupled to the sound port 16. In one or more embodiments, the acoustic device 24 may receive or generate sound propagating through the sound port 16. In one or more embodiments, the acoustic device 24 may receive or generate sound propagating through both the sound port 16 and the plug port 14.

The acoustic device 24 may be a microphone configured to sense an acoustic signal, for example, in the audio range or the ultrasonic range. The acoustic signal may be a signal passing through the sound port 16 (or through the sound port 16 and plug port 14). The microphone may, for example, be a micro electro mechanical system (MEMS) microphone or an electrets-condenser microphone (e.g., ECM). In one or more embodiments, the MEMS microphone may, for example, include a MEMS microphone die and an application specific integrated circuit (AISC) device which may comprise an amplifier. In one or more embodiments, the MEMS microphone die may include at least one diaphragm and at least one backplate.

The microphone may have a directional characteristic comprising a preferred direction to sense acoustic signals. The preferred direction may be directed towards the sound port 16. Alternatively, the acoustic device 24 may be, for example, a loudspeaker configured to transmit the acoustic signal through the sound port 16. The loudspeaker may comprise a preferred direction to emit acoustic signals, wherein the preferred direction may be directed towards the sound port 16.

The acoustical device 24 may be in acoustical communication with the outside environment OUTENV of apparatus 10. In one or more embodiments, acoustic energy may propagate from the outside environment OUTENV through the plug port 14, through the socket cavity 13 and through the acoustic port (i.e., the sound port 16). In one or more embodiments, acoustic energy may propagate from the acoustic device 24 through the sound port 16, through the socket cavity 13 and through the plug port 14 to the outside environment OUTENV. Hence, between the acoustic device 24 and the outside environment OUTENV is a sound channel 26 through which the acoustic energy propagates. The sound channel 26 may comprise at least a portion of the sound port 16, at least a portion of the cavity 13 and at least a portion of the plug port 14. For example, an acoustic signal from the outside OUTENV of the apparatus 10 may pass through the plug port 14 and the sound port 16 via the sound channel 26 in a direction towards the acoustic device 24 when, for example, the acoustic device 24 is formed as a microphone. Alternatively, an acoustic signal provided by the acoustic device 24 formed as a loudspeaker may propagate through the sound port 16 and through the plug port 14 via the sound channel 26 to outside OUTEVN of the apparatus 10. A diameter or an opening area of the sound port 16 may be set arbitrarily and may be selected depending on damping factors of the sound port 16 with respect to a frequency range, e.g., a low damping in a frequency range of speech and a high damping in a range of lower frequencies. Alternatively or in addition, the diameter, the opening surface or the geometry of the opening surface of the sound port 16 may vary along the sound channel 26.

An advantage of the female connector also comprising the sound port may be the possibility of realizing housings or covers of the sound processing apparatus with a reduced number or without any provision of a sound port beyond the plug port. In other words, the housing merely needs one opening (e.g., a hole), which may provide advantages in design matters and dirt resistance of an inner of the housing. Compared to the case of the sound processing apparatus comprising a keypad with arranging the sound port at a slit of the keypad, arranging the sound port to sound-communicate with the outer environment via the plug port helps in avoiding or reducing a distortion of the sound passing the sound port by superimposing key pressing noises.

The apparatus 10 may be configured to process the audio data, for example, using a central processing unit (CPU) 28 connected to the acoustic device 24. The processing of the audio data may comprise a consideration of a correction value 32 which may consider hardware specific parameters with respect to the acoustic device 24, such as, for example, emittance parameters of a loudspeaker or a consideration of directional dependencies of a microphone. Apparatus 10 may be configured to detect a connection between the associated plug and the socket 12. By plugging the associated plug into the socket 12, a new body is inserted into the cavity 13 of the socket 12. Thus, the sound channel 26 may change, for example, as a direct path from the plug port 14 to the sound port 16 is blocked by the associated plug, as it will be described later on. Apparatus 10 may further be configured to modify the correction value 32 dependent on the connection of the associated plug to the socket 12, which may comprise a consideration of a change of the sound channel 26. In other words, if the acoustic device 24 was a sound detecting device such as a microphone, the CPU 28 would, for example, equalize an acoustic signal output or transmitted by the said acoustic device 24 using the correction value. The correction value could be obtained by a calibration and stored in a memory. Upon plugging a plug into the socket 12, the correction value would be adapted to take the distortion of the sound channel 26 leading from outside via the plug port 14 and the sound port 16 to said acoustic device 24 into account. The modified correction value could also be determined by calibration prior to shipping of the apparatus 10. If the acoustic device 24 was a sound emitting device such as a loudspeaker, the CPU 28 would, for example, equalize an acoustic signal input by the said acoustic device 24 using the correction value.

Plugging or unplugging a plug into or out of a socket is a slow procedure of switching between relatively static states in terms of a plug or a male connector being inserted in a socket or a female connector. Thus, recognition of the associated plug being connected to the socket 12 and modifying the correction value 32 enables the apparatus 10 to optimize the sound channel 26 dependent on the state connected or disconnected.

Microphones and loudspeakers, especially in mobile devices, need a sound port to sense acoustic signals or to output, i.e., to transmit, acoustic signals respectively. The sound port may end up in an opening or a hole in a cover of the mobile device, which may disturb the design of the device. One aim of designers may be to optimize the design of the device, which may cause designers to try to reduce a number of openings (e.g., holes) in the device, for example, a mobile device like a cellular phone, or to try to hide them if possible. As some designers may consider the holes of a sound port as "ugly holes," the designers may not only try to reduce the number of holes, but try to avoid all of them. Instead of putting an "ugly hole" in the cover of the device, the hole may be hidden behind a slit of a keypad. This leads acoustic devices, especially microphones, to sense an increased amount of handling noise, as using the keypad leads to a dynamical change of the sound path in front of the sound port, which leads to increased tolerances of the sound channel to be considered during processing audio data. In addition, a hiding of a hole behind a keypad does not work for smartphones with touch only, because there is no keypad available in the hardware.

The correction value can be a single variable indicating the status of the sound channel, e.g., a damping factor. Alternatively, the correction value 32 may comprise a set of parameters indicating the status of the sound channel. Using a set of parameters allows a more detailed description and/or modeling of the sound channel for processing the audio data by the CPU 28.

With respect to typing on a keypad, which may be done with a high repetition rate, e.g., when writing an email, plugging or unplugging of a male connector (plug) into or out of a female connector (socket), e.g., an USB-, an AV- or a system-connector may be a slow procedure with a low repetition rate. Therefore a sound channel comprising the sound port which is arranged at the respective socket allows a reliable modulation of the sound channel including a consideration and modification of the correction value. With respect to a keypad which may comprise a plurality of keys, each key causing a noise from a separate distance and a different direction to the sound port when being pressed, a plugging of a plug into a socket may be described by two states or modes of the connector, a so-called plugged mode and an unplugged mode.

Although some of the descriptions or explanations herein refer to a socket that comprises a notch for accommodating the acoustic device, one may also think of a socket molded with the acoustic device and therefore form a special integral or discrete socket that may be mounted in or at an apparatus, e.g., a mobile or immobile device. The integral special socket may be formed as a surface-mounted device (SMD). Alternatively, the socket body and the acoustic device may be modular components mounted to a modular socket.

In other words, the acoustic device formed by a MEMS package may be glued or soldered to the socket body. The MEMS package may comprise a housing or may be glued or soldered without a housing to the socket body. Alternatively, the MEMS may be packaged at least partially by the socket body such that at least a portion of the socket body forms a housing of the acoustic device.

Figure 2:
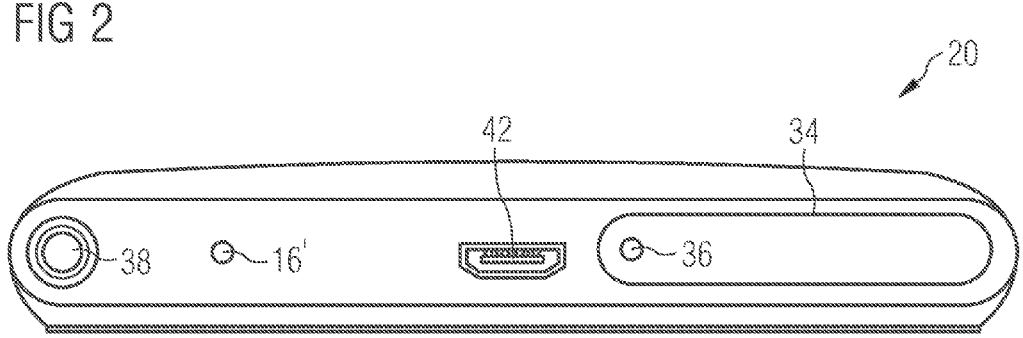
FIG. 2 shows a bottom view of an apparatus formed as a cover of a cellular phone.

FIG. 2 shows a bottom view of an apparatus 20 formed as a cover of a cellular phone. Besides a cover 34 with a keyhole 36 for covering a not shown subscriber identity module (SIM) holder, an audio connector 38, a micro-USB connector 42, and a sound port 16' are shown. The sound port 16' is formed as an opening (e.g., a hole) in the cover of the cellular phone with a round shape. The sound port 16' may be regarded as ugly as described before. The sound port 16' to be arranged at the cover of the apparatus 20 may be prevented by arranging the sound port 16' within apparatus 20 at the micro-USB connector 42 or the audio connector 38.

FIG. 3a shows a schematic cross-sectional view of a socket 44 which is an embodiment of the present invention. The socket 44 may be a USB connector, e.g., a USB socket. The socket 44 includes an acoustic device 24'. FIG. 3a also shows a simplified cross-section view of the acoustic device 24'. In one or more embodiments, the acoustic device 24' may be a microphone such as a MEMS microphone. The acoustic device 24' may be a MEMS microphone and may comprise a MEMS die 48 and an ASIC 49 which are interconnected electrically as indicated by a connection line 52a. The acoustic device 24' may be arranged at a side of a support 54 and may be electrically and/or mechanically coupled to the support 54 as indicated by a connection line 52b. The support 54 may, for example, be a printed circuit board (PCB). The support 54 may at least partially form one of the side walls of the socket 44 and thus be at least partially part of the socket 44. The support 54 may be part of an apparatus configured to process audio data as shown in FIG. 1 or may be connected to the apparatus, e.g., a CPU of the apparatus.

The USB socket 44 comprises the acoustic device 24' and a socket body which may be formed by a frame 56, a carrier 58, the contact 62 and the support 54 having a connection 64. The frame 56 may comprise a metallic material, e.g., aluminum and/or plastics. The carrier 58 may comprise plastic material and may be configured to insulate metallic materials like the frame 56 from the support 54 (e.g., the PCB). The socket body (54, 56, 58, 62) forms, i.e., defines, a cavity 13. The contact 62 of the USB socket 44 is connected to the support 54 via the connection 64 which may be formed as a welding pad, for example. The contact 62 is configured to provide a contact with a plug or male connector as it will be shown in FIG. 3b. For example, the contact 62 may comprise a segment 66 which may be formed as a spring. Further, the USB socket 44 comprises the plug port 14 and the sound port 16. The sound channel 26 is arranged between the acoustic device 24' and the plug port 14. In other words, the socket 44 comprises the socket body (54, 56, 58, 62) and the acoustic device 24'.

The carrier 58 may comprise a recess (e.g., a notch or a cavity) 67 formed in a sidewall of the carrier 58. Alternatively, the recess 67 may be formed at least partially in the support 54, when the support 54 forms a side wall of the socket 44. The recess (e.g., a notch) 67 provides a space configured to host the acoustic device 24'. Hence, as shown in FIG. 3a, the socket body (54, 56, 58, 62) includes a recess 67 for housing the acoustic device 24'. In the embodiment shown, a sidewall of the socket body (54, 56, 58, 62) includes the recess 67 (e.g., a notch) for housing the acoustic device 24'. The acoustic port 16 may be formed through the frame 56 of the socket body (54, 56, 58, 62).

The acoustic device 24' may be supported by a support 54. The support 54 may be a PCB board. The PCB board may be part of the socket body (54, 56, 58, 62) and extend further as the socket 44. The PCB may comprise further mechanical and/or electrical components such as processors, capacitors, coils or resistances in domains or circuits adjacent or spaced from the rest of the socket body (56, 58, 62). The acoustic device may be arranged between the support 54 and the socket cavity 13. With the exception of the sound port 16 the acoustic device 24' may be acoustically enclosed. With the exception of noise or sound which is transmitted through the support 54 (e.g., PCB) or the carrier such a configuration enables the acoustic device 24' (the microphone) to sense acoustic signals through the sound port 16 with a satisfying quality.

FIG. 3b shows a schematic cross-sectional view of the acoustic device 24' and the USB socket 44, wherein an USB plug 68 is connected to the USB socket 44. The plug 68 comprises a spring 72 which is configured to position the plug 68 with respect to the segment 66 such that a contact 74 of the plug 68 is connected to the contact 62 within the segment 66 and an electrical and/or mechanical connection between the USB socket 44 and the plug 68 is provided. An apparatus comprising the USB socket 44 may be configured to recognize the connection between the contacts 62 and 74. As parts of the plug 68 are located within the cavity 13 of the USB socket 44, the former sound channel 26 has changed to sound channel 26'. Parts of the former sound channel 26 are blocked by the parts of the plug 68 within the cavity 13 of the USB socket 44 as it is indicated by the dots showing the former sound channel 26. The parts of the plug 68 inserted into the cavity 13 of the USB socket 44 are smaller than the available space within the cavity 13 so that a sound channel can be present and is not blocked completely.

Recognition of the connection between the plug 68 and the USB socket 44 enables the apparatus comprising the USB socket 44 to modify the correction value for the acoustic device 24' as it is explained in FIG. 1.

Sound from outside the apparatus travels through the plug port 14 defined by the connector opening via the sound channel 26 or 26' and through the sound port 16. Other embodiments show a loudspeaker instead or in addition to the microphone (acoustic device) 24', wherein a modification of the correction value leads to a modification of sound transmitted by the loudspeaker and passing the sound port 26, the sound channel 26 or 26' and the plug port 14. A modification of the correction value enables an optimization of a sound quality of the sound transmitted by the loudspeaker, which may be, for example, listened to by people or recorded by another apparatus. When a plug is plugged in the plug port, the USB socket 44 respectively, there is still enough space for the sound channel 26'. In other words, the apparatus, e.g., a mobile device, can detect the plug 68, the connection of the plug 68 to the USB socket 44 respectively, and can change the tuning, e.g., switch to the plugged mode in case of the plug 68 being connected or switch to the unplugged mode in case the plug 68 being disconnected.

A sound quality of acoustic signals in the plugged mode may be different from the sound quality in the unplugged mode, wherein the sound quality in the plugged mode may be good enough for basic and/or advanced usage.

Figure 4A:
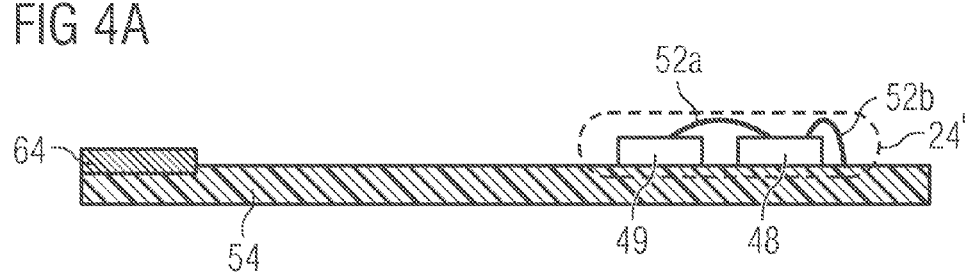
FIG. 4a shows a schematic cross-sectional view of a first step of an implementation of the USB socket described in FIGS. 3a and 3b.

FIG. 4a shows a schematic cross-sectional view of a first step of an implementation of the USB socket 44 described in FIG. 3. The MEMS acoustic device 24' is arranged at the support 54. The support (e.g., a PCB) 54 may comprise the connection point 64. The support 54 may be, for example, a PCB board. The MEMS 48, the ASIC 49 and the connections 52a and 52b are arranged at a side of the support 54 and form at least partially the acoustic device the 24'. In other words, the MEMS 48 and the ASIC 49 are placed on the PCB 54 and bond to it.

Figure 4B:
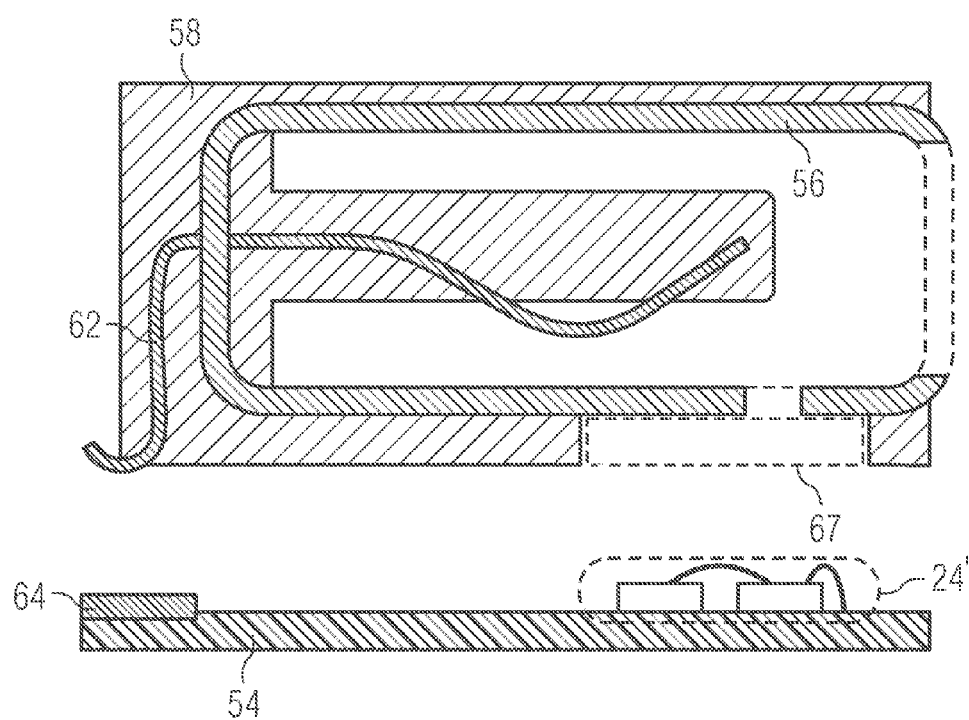
FIG. 4b shows a schematic cross-sectional view of a second step of the implementation of the USB socket described in FIGS. 3a and 3b.
Figure 4C:
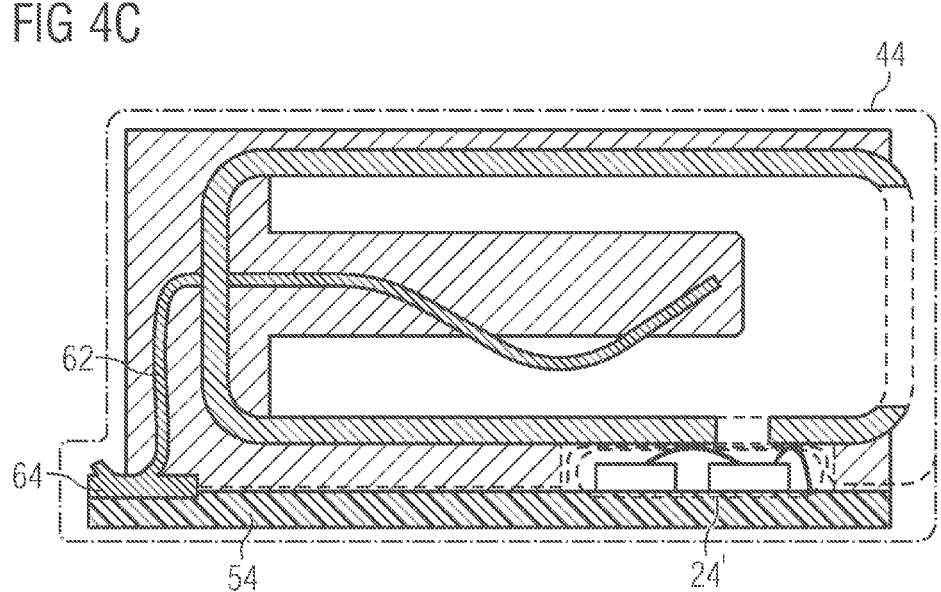
FIG. 4c shows a schematic cross-sectional view of a third step of the implementation of the USB socket described in FIGS. 3a and 3b.

FIG. 4b shows a schematic cross-sectional view of a second step of the implementation. Further parts of the socket body (56, 58, 62) are arranged at the side of the support 54 at which the acoustic device 24' is arranged, such that the recess 67 can host the acoustic device 24'. A fixing of the components (56, 58, 62) may allow for forming the socket body (54, 56, 58, 62). The fixing of the components (56, 58, 62) to the support 54 may be done via an adhesive or via soldering or welding points, for example. In other words, the frame 58 forming partially the socket body is placed on the support 54 with the adhesive, yielding the USB socket 44, as it is depicted in FIG. 4c. Alternatively, when, for example, the socket is connected optically to an apparatus such as by a fiber-optical cable, the support 54 may be configured to seal the recess 67 without enabling an electrical interconnection between the acoustic device 24' and the apparatus. The electrical interconnection may be realized spaced from the support 54 such as an additional wire to the fiber-optical cable.

FIG. 4c shows a schematic cross-sectional view of a third step of the implementation. The contact 62 is connected, e.g., soldered or welded, to the contact 64. The contact 62 partially forms a spring at the end of the contact 62 adjacent to the contact 64, which enables a close distance between the contacts 62 and 64 and a minimization of forces stressing the soldered contact between the contacts 62 and 64. In other words, the spring 62 is welded to the support 54.

Figure 4D:
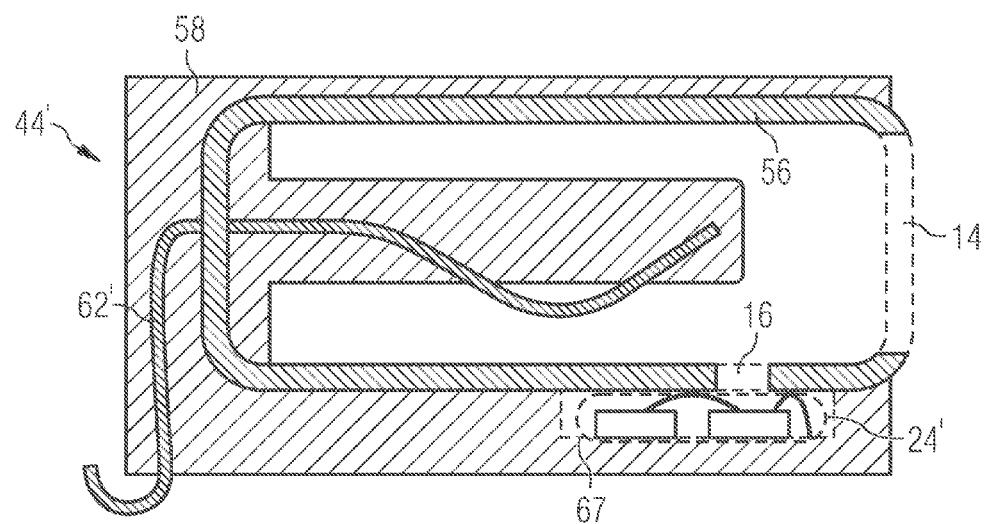
FIG. 4d shows a schematic cross-sectional view of a combined device comprising a socket with the acoustic device.

FIG. 4d shows a schematic cross-sectional view of a combined device which may be an alternative implementation of an USB socket 44'. The USB socket 44' comprises the acoustic device 24' which is arranged inside the recess 67 of the socket 44', e.g., a notch. Thus, the acoustic device 24' and the socket body (56, 58, 62) form a combined or discrete device. The recess 67 may comprise the sound port 16 to enable a sound channel between the acoustic device 24' and the plug port 14 and may be configured to host the acoustic device 24'. In other words, the support for supporting the acoustic device 24' is formed by parts 58 of the socket body (56, 58, 62) respectively the carrier 58.

A connection of the acoustic device 24' to a PCB may be realized by combining the contacts of the acoustic device 24' with the contacts of the socket to a common arrangement of contacts 62'. Thus, the combined device may comprise a combined port of contacts 62' for all or some of the sub-devices, such as the electrical socket and the acoustic device 24'. Alternatively or in addition, the combined device may comprise a housing configured to host at least the acoustic device 24', e.g., the hosted acoustic device may be hosted in the recess, wherein the recess may be filled with any kind of material, such as plastics, an adhesive or metal. In other words the acoustic device may comprise an arrangement of MEMS and/or ASIC components which are arranged in the recess 67 which is covered by the carrier 58 of the socket 44'. Alternatively, the MEMS and/or ASIC components may be formed as a housed MEMS package. The MEMS package may be hosted by the recess 67 which enclosed by the carrier 58. The carrier 58 may be formed by one or more parts. If the carrier 58 is formed by one part, the recess 67 may be, for example, molded such that the acoustic device 24' is enclosed by the carrier 58 during molding. Thus, the recess 67 may be formed by the acoustic device 24' or the housing of the acoustic device 24' during molding the carrier 58. In case the carrier 58 is formed by two or more parts, the acoustic device 24' may be inserted into the recess 67 during combining the parts of the carrier 58.

A combining of the acoustic device 24' and the socket 44' may provide a more rapid production of an apparatus having the socket 44' with the acoustic device 24' as one discrete device (socket 44' with the acoustic device 24') may be arranged at the support (PCB) within one production step instead of the subsequent production steps for implementing an embodiment according to FIGS. 4a and 4b.

Figure 5:
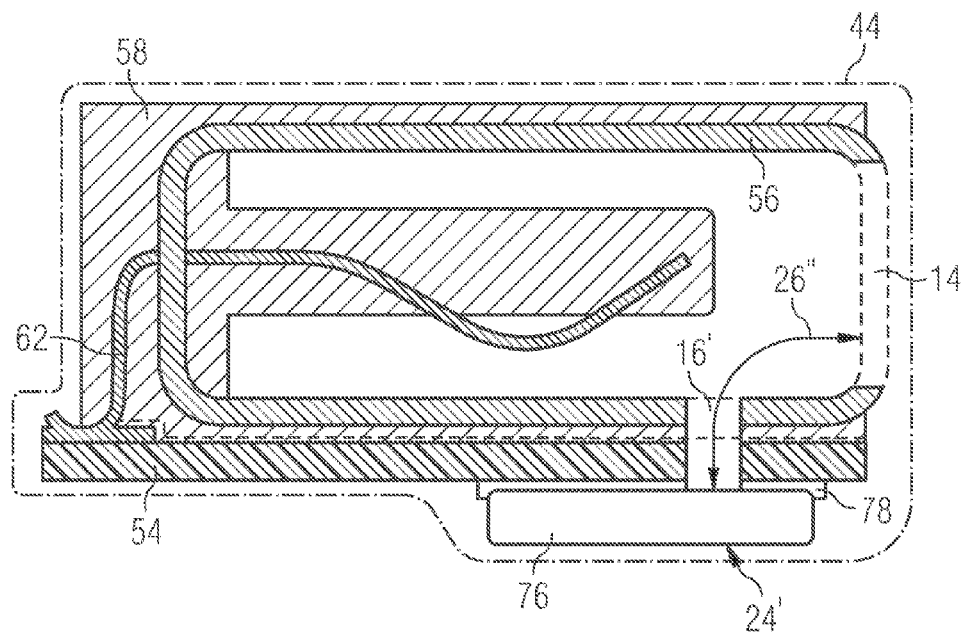
FIG. 5 shows a schematic cross-sectional view of an arrangement of the microphone with respect to the socket body according to an alternative embodiment of the present invention.

FIG. 5 shows a schematic cross-sectional view of an alternative arrangement of the acoustic device 24' with respect to the socket body (54, 56, 58, 62). The acoustic device 24' may be arranged inside a housing 76 which may be arranged at a side of the support 54 opposing the side at which further parts (56, 58, 62) of the socket body (54, 56, 58, 62) are arranged. A sound port 16' extends to the support 54 by means of a space (e.g., a hole or a channel) within the support 54, which is configured to let acoustic signals pass. The housing 76 can encapsulate the acoustic device 24' acoustically such that, when the acoustic device is a microphone, acoustic signals which are sensed by the acoustic device 24' probably passed the sound port 16' with a considerable share, e.g., with exception of noise or sound transmitted through the housing 76, such that a good or high acoustic shielding may be realized. Thus, the acoustic device 24' is configured to sense acoustic signals which pass the plug port 14 and travel along the sound channel 26" through the sound port 16', when the acoustic device is a microphone. When the acoustic device is of a different kind, e.g., a loudspeaker, emitted acoustic signals may travel with a considerable share through the sound port 16' and along the sound channel 26". The housing 76 is arranged at the support 54 with a fixture 78, for example an adhesive, welding points or soldering points. The arrangement of the acoustic device 24' at the side of the support 54 opposing the side at which the frame 58 is arranged may be named as a bottom port microphone. In other words, the bottom port microphone is placed under the frame 58 on the other side of the support 54. The USB connector, the USB socket 44 respectively, has a sound port 16' for the acoustic device 24'.

An arrangement as it is shown in FIG. 5 can comprise an embodiment with a body (54, 56, 58, 62) of a USB socket 44 which may be separated from the acoustic device 24'. An advantage of the embodiment with the separated USB socket 44 may be a simpler implementation with respect to a combined version, which is described in FIGS. 1 to 4. Another advantage of the version with the separated USB socket 44 may be that the socket body (54, 56, 58, 62) and the acoustic device 24' probably can be manufactured independently from each other.

In contrast, an advantage of a combined version, describing the USB socket 44 encapsulating the acoustic device 24' may be that only one side of the PCB will probably be used for arranging components. This may be important when the apparatus requires further components to be arranged at the opposing side, for example, a display of a smartphone which is directly placed on one side of the PCB.

Although the embodiments described in FIGS. 2 to 5 relate to an acoustic device formed as a microphone, further embodiments relate to an acoustic device formed as a loudspeaker.

Figure 6:
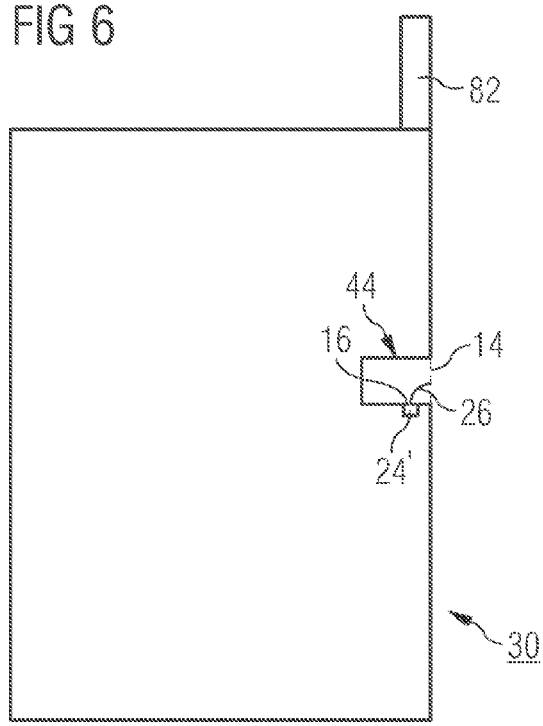
FIG. 6 shows a schematic block diagram of a sound processing cellular phone configured to process audio data based on a correction value according to an embodiment of the present invention.

FIG. 6 shows a schematic block diagram of a sound processing cellular phone 30 configured to process audio data based on a correction value. The sound processing cellular phone 30 may comprise an antenna 82 configured to enable the sound processing cellular phone 30 to perform communication with another apparatus, e.g., a base station of a cellular network. The sound processing cellular phone 30 may comprise the USB socket 44 with the acoustic device 24'. The USB socket 44 can be configured to be connectable with an USB plug through the plug port 14. The USB socket 44 comprises the sound port 16. The sound channel 26 is formed by a path between the plug port 14 and the acoustic device 24' and comprises the sound port 16. The sound processing cellular phone 30 can further be configured to recognize a connection of the USB plug to the USB socket 44 and can further be configured to modify the correction value dependent on the recognition.

A sound processing cellular phone comprising a sound port at a connector, e.g., an USB connector, may allow designers of the cellular phone to design covers of the cellular phone with a reduced number of holes or openings within the cover (housing), wherein the holes or openings may be disturbing or even ugly for designers and users.

FIG. 7 shows a flowchart of a method 100 for processing audio data. In a first step 102 an acoustic signal is let pass through a sound port. In a second step 104 the acoustic signal is sensed through a sound port and a plug port or is transmitted through the sound port and the plug port.

FIG. 8 shows a flowchart of a method 200 for processing audio data. The first step of method 200 equal step 102 of method 100 described in FIG. 7 and the second step equals step 104 of method 100. In a third step 206 the audio data is processed according to a correction value. In a fourth step 208 a connection of a plug being connected to a socket is recognized. In a fifth step 212 the correction value is modified based on the recognition of the connection.

By modifying the correction value according to the connection of the plug to the socket, sound quality sensed by a microphone or transmitted by a loudspeaker may be optimized according to outer circumstances, namely the plug being connected to the socket.

Although the above described embodiments relate to a USB socket configured to be connectable with a USB plug, the socket may be any kind of connector forming a cavity such as, for example, an audio/video (AV) socket, a charging socket, a power supply socket or a system connector.

Although connections between a socket and a plug or the PCB and the socket have always been described utilizing one contact each, the socket, the plug and the PCB may comprise a plurality of contacts for performing a connection between the components.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, some embodiments of the invention can be implemented in hardware or in software. The implementation can be performed using a digital storage medium, for example, a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example, via the Internet.

A further embodiment comprises a processing means, for example, a computer, or a programmable logic device, configured to or adapted to perform one of the methods described herein.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A socket comprising:
   a socket body of the socket forming a socket cavity for receiving a plug through a plug port, the socket body configured to receive a plug associated with the socket to enable an electrical connection between the socket and the plug;
   an acoustic device arranged completely within the socket body, wherein the acoustic device is a microphone or a loudspeaker; and
   a sound port disposed in the socket body for acoustically coupling the acoustic device with the cavity and with an outside environment through the plug port,
   wherein the sound port is an opening in the socket body different from the plug port,
   wherein acoustic energy is configured to travel between the acoustic device and the outside environment through the plug port, the cavity and the sound port,
   wherein the socket is a single surface-mounted device, and
   wherein the sound port comprises a direction transverse to a plugging direction of the socket.

2. The socket as in claim 1, further comprising a plug port as an opening in the socket body, wherein the plug port is configured to receive a plug, and wherein a path between the plug port and the acoustic device comprises the sound port.

3. The socket as in claim 1, further comprising a plug port as an opening in the socket body, wherein the plug port is configured to receive a plug, wherein a propagation of acoustic energy from an outside environment through the plug port, the socket cavity and the sound port or from the acoustic device through the sound port, the socket cavity and the plug port to the outside environment is enabled by the acoustic coupling.

4. A sound processing apparatus comprising:
an electrical socket body of a socket forming a socket cavity for receiving a plug through a plug port, the socket body configured to receive the plug associated with the socket to enable an electrical connection between the socket and the plug;
an acoustic device;
a sound port disposed in the socket body for acoustically coupling the acoustic device with the cavity and an outside environment through the plug port, wherein the sound port is an opening of the socket body different from the plug port, and wherein acoustic energy is configured to travel between the acoustic device and the outside environment through the plug port, the cavity and the sound port; and
a housing comprising an opening forming at least partially the plug port configured to let pass the plug, the housing configured to house the acoustic device, so that the acoustic device is acoustically coupled to an outside of the housing via the sound port and the plug port,
wherein the sound processing apparatus is configured to:
process audio data based on a correction value,
recognize a connection of the plug to the socket body, and modify the correction value dependent on the recognition,
wherein the sound processing apparatus is a mobile device,
wherein the sound processing apparatus is a cellular phone, a laptop or a tablet computer, and
wherein the acoustic device is arranged inside the housing and arranged in series with respect to the plug port and the sound port.

5. The sound processing apparatus as in claim 4, wherein the sound processing apparatus comprises a printed circuit board (PCB), and wherein the socket body is arranged at a side of the printed circuit board and the acoustic device is arranged at the same side of the printed circuit board.

6. The sound processing apparatus as in claim 5, wherein the acoustic device is arranged between the printed circuit board and the socket body so that the acoustic device is acoustically enclosed with an exception of the sound port.

7. The sound processing apparatus as in claim 4,
wherein the socket body is arranged at a side of a printed circuit board and the acoustic device is arranged at an opposing side of the printed circuit board so that a path between a plug port and the acoustic device defines a sound channel, and
wherein the sound channel extends to the sound port and the printed circuit board.

8. The sound processing apparatus as in claim 4, wherein the acoustic device is a microphone or a loudspeaker.

9. The sound processing apparatus as in claim 4, wherein the acoustic device is a micro electro mechanical system (MEMS).

10. The sound processing apparatus as in claim 4, wherein at least a portion of the socket body forms a housing for the acoustic device.

11. The sound processing apparatus as in claim 4, wherein the acoustic device is fixed to the socket body such that the acoustic device and the socket body are a discrete device.

12. The sound processing apparatus as in claim 4, wherein a distance between the sound port and a plug port is less than 50% of a plugin length of the socket.

13. The sound processing apparatus as in claim 4, wherein the socket is an universal serial bus (USB) socket.

14. The sound processing apparatus as in claim 4, wherein the socket is an audio/video (AV) socket.

15. The sound processing apparatus as in claim 4, wherein the socket is a charging socket or a power supply socket.

16. The sound processing apparatus as in claim 4, wherein the socket is a system connector.

17. The sound processing apparatus as in claim 4, wherein the sound port is an opening of the socket body, wherein the sound port is different from a plug port of the sound processing apparatus, and wherein the plug port is configured to receive the plug.

18. The sound processing apparatus as in claim 4, further comprising a processor configured to equalize an acoustic signal output transmitted by the acoustic device using the correction value or configured to equalize an acoustic signal input by the acoustic device using the correction value.

19. The sound processing apparatus as in claim 4, further configured to equalize an acoustic signal output by the acoustic device using the correction value or configured to equalize an acoustic signal input by the acoustic device using the correction value.

20. The sound processing apparatus as in claim 4, wherein the electrical connection with the plug and an electrical connection to the acoustic device is powered by a common power source.

21. A sound processing cellular phone configured to process audio data based on a correction value, the cellular phone comprising:
an electrical socket body forming a socket cavity for receiving a plug through a plug port to enable an electrical connection between the socket and the plug;
a microphone configured to sense an acoustic signal through a sound port, the sound port disposed in the socket body for acoustically coupling the microphone with the cavity and with an outside environment through the plug port; and
a housing comprising an opening forming at least partially a plug port configured to let pass the plug, the housing configured to house an acoustic device so that the microphone is acoustically coupled to an outside of the housing via the sound port and the plug port,
wherein a path between the plug port and the microphone comprises the sound port and defines a sound channel,
wherein the cellular phone is configured to recognize a connection of the plug to the socket, wherein the cellular phone is further configured to modify the correction value dependent on the recognition, and
wherein the acoustic device is arranged inside the housing and arranged in series with respect to the plug port and the sound port.

22. A method for processing audio data comprising:
passing an acoustic signal through a sound port of an electrical socket body, the sound port disposed in the socket body for acoustically coupling an acoustic device with the cavity and with an outside environment through the plug port, and the sound port being an opening in the socket body different from the plug port, wherein the socket is a single surface-mounted device, wherein the sound port comprises a direction transverse to a plugging direction of the socket, and wherein the acoustic device is a microphone; and
sensing, completely within the socket body and when the acoustic device is a microphone, the acoustic signal through the sound port, a cavity of the electrical socket body and a plug port of the electrical socket body or transmitting, completely within the socket body and when the acoustic device is a loudspeaker, the acoustic signal through the sound port and the plug port, the cavity for receiving a plug through a plug port, the socket body configured to receive a plug associated with the socket to enable an electrical connection between the socket and the plug, such that acoustic energy travels between the acoustic device and the outside environment through the plug port, the cavity and the sound port.

23. The method as in claim 22, further comprising:

processing of the audio data based on a correction value;

recognizing a plug being connected to the electrical socket; and modify the correction value based on the recognition of the connection.

\* \* \* \* \*